(No Model.) 3 Sheets—Sheet 1.

W. B. MANN.
CAN TESTING MACHINE.

No. 521,935. Patented June 26, 1894.

Witnesses
Alvan Macauley
Charles B. Mann Jr.

Inventor
Wm B. Mann
By Chas B. Mann
Attorney (No Model.) 3 Sheets—Sheet 2.

W. B. MANN.
CAN TESTING MACHINE.

No. 521,935. Patented June 26, 1894.

Witnesses
Alvan Macauley
Charles B. Mann Jr.

Inventor
Wm B. Mann
By Chas B. Mann
Attorney (No Model.)   3 Sheets—Sheet 3.
W. B. MANN.
CAN TESTING MACHINE.
No. 521,935.   Patented June 26, 1894.
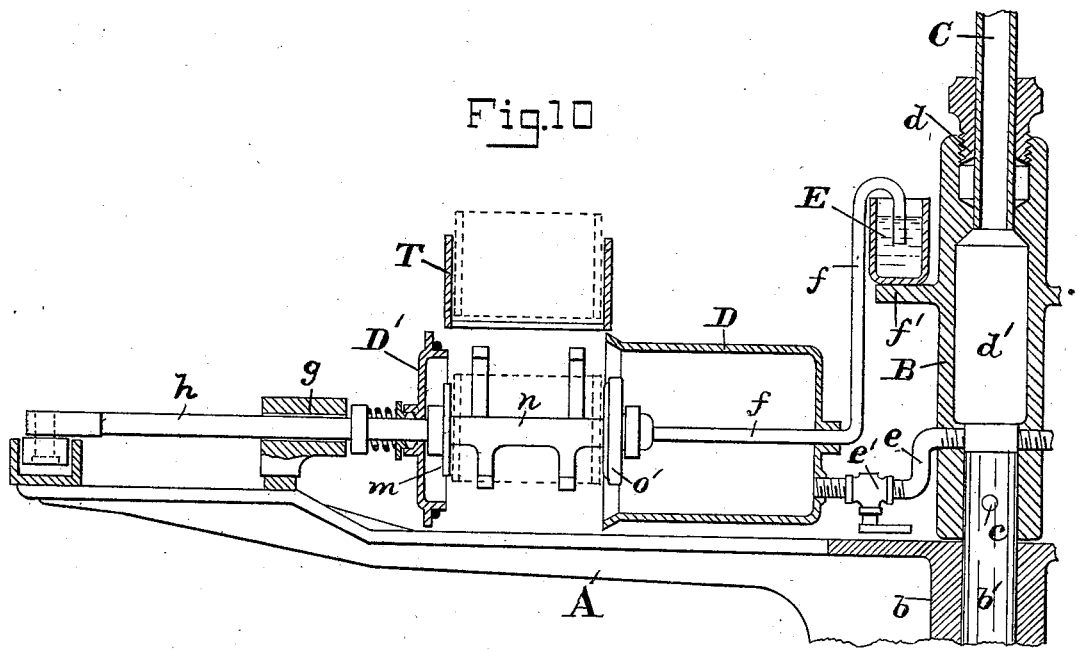
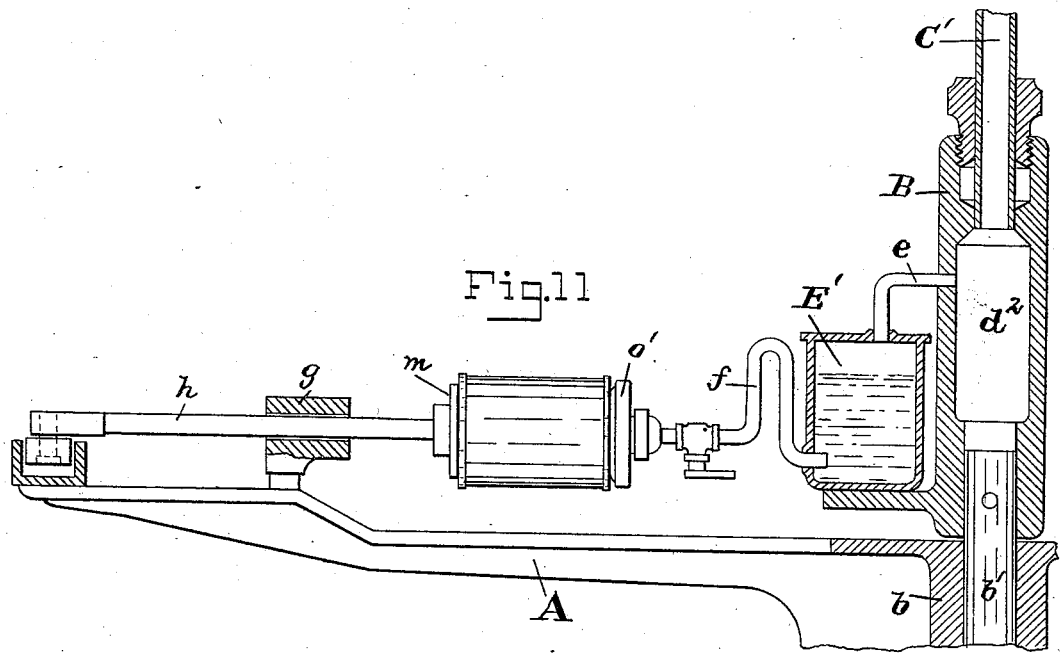
Witnesses.
Alvan Macauley.
Charles B. Mann Jr.
Inventor.
Wm B. Mann
By Chas B. Mann
Attorney.

UNITED STATES PATENT OFFICE.

WILLIAM B. MANN, OF BALTIMORE, MARYLAND.

CAN-TESTING MACHINE.

SPECIFICATION forming part of Letters Patent No. 521,935, dated June 26, 1894.

Application filed July 11, 1893. Serial No. 480,134. (No model.)

*To all whom it may concern:*

Be it known that I, WILLIAM B. MANN, a citizen of the United States, residing at Baltimore, in the State of Maryland, have invented certain new and useful Improvements in Can-Testing Machines, of which the following is a specification.

This invention relates to a new and improved method and machine for testing tin cans to discover leaks either in the tin plate or in the soldered seams.

The object of the invention is to provide a method and an apparatus for testing cans by air-pressure without wetting the can or submerging it in water,—the desideratum is to keep the can dry and have the leak demonstrated to the attendant's eye by discharging the leaked air into liquid to produce air bubbles.

In order to make my invention clearly understood I have shown in the accompanying drawings means for carrying same into practical effect without intending to limit my invention to the particular constructions, as the mechanical part of the invention, as broadly conceived by me, and as defined in my claims hereinafter set forth, may be embodied in other forms.

Figures 1, 2:
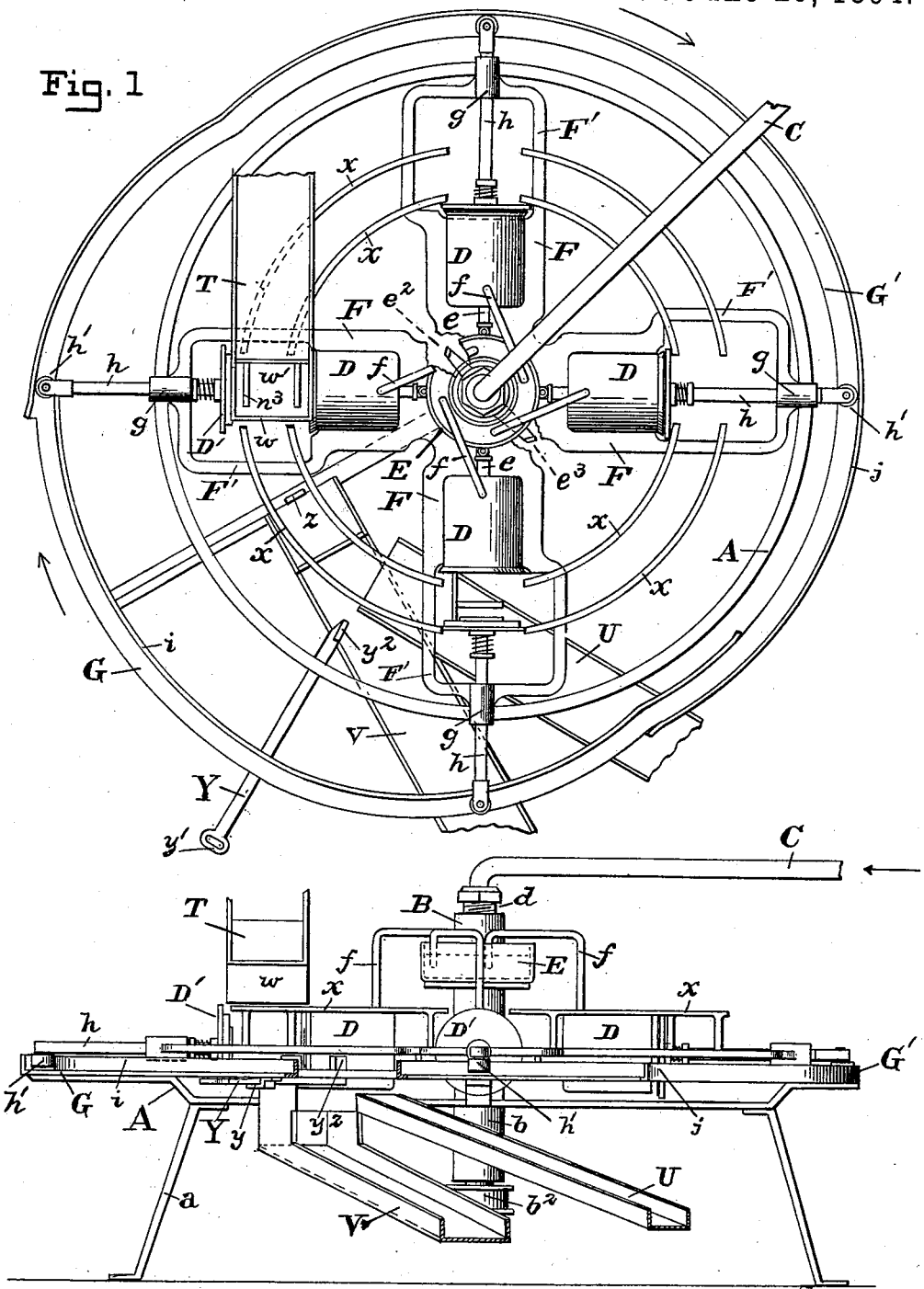
Figure 3:
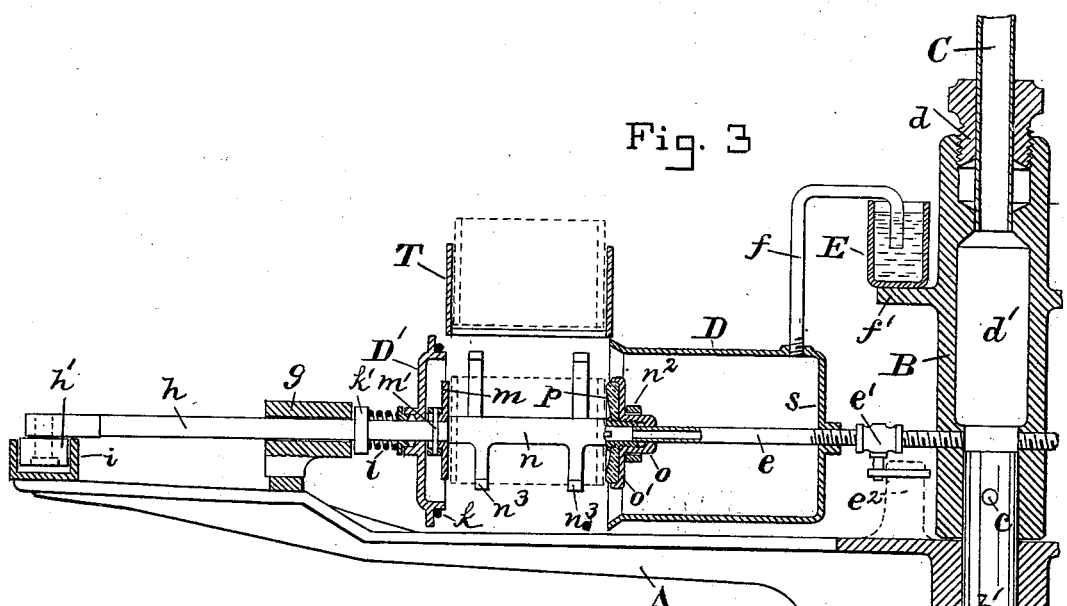
Figures 4, 5, 6:
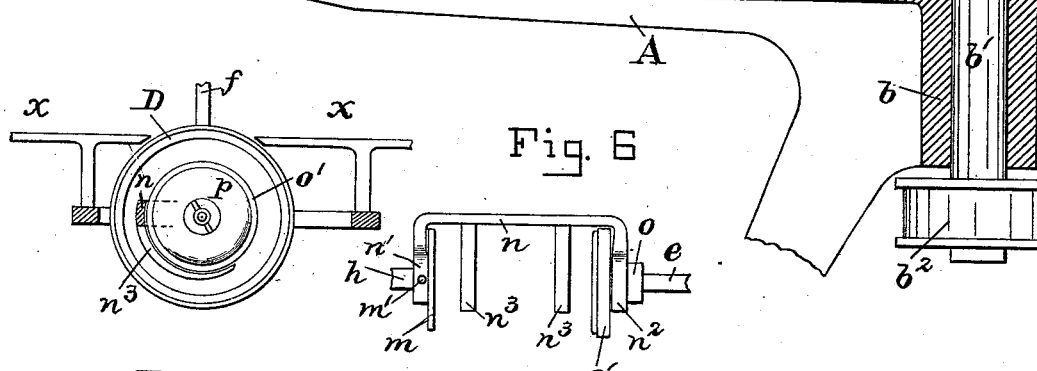
Figures 7, 8:
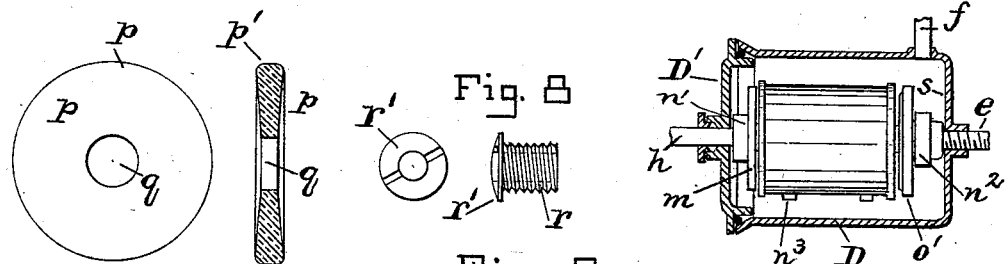
Figure 9:
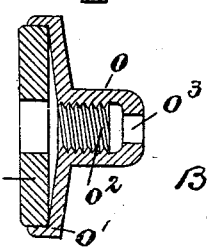

Referring to the drawings,—Figure 1. is a top view of the machine. Fig. 2. is a side view of the same. Fig. 3. is a view in detail on a larger scale, showing the leading parts. Fig. 4. is a view of one test-chamber closed. Fig. 5. is a view of the open end of the test-chamber, and part of the can-holder and track-rails. Fig. 6: is a view of the can-holder. Fig. 7. is a view of the elastic sealing cap. Fig. 8. shows two views of the screw-bushing. Fig. 9. shows a modification of the sealing cap. Fig. 10. shows a modification in the relative arrangement of the supply-pipe and leak-pipe. Fig. 11. shows a modification whereby the test is made by an exhaust of the air from the can, that is, by the vacuum plan.

The letter, A, designates the stand or supporting frame of the machine, and, $a$, the legs thereof. At its center this stand has a bearing, $b$, through which turns a vertical shaft, $b'$, with a driving pulley, $b^2$, on it below the stand; above the stand a hollow post, B, is attached to the vertical shaft by a pin, $c$. Either compressed air or vacuum, *i. e.*, exhaust of air, may be employed. The compressed-air plan will first be described.

Referring to Figs. 1 to 10, an air-supply pipe, C, leading from any suitable source enters the top of the hollow post and is made air-tight by a stuffing box, $d$; the post and box are free to turn about the end of the pipe. This post has an air-chamber, $d'$, and pipes, $e$, are fitted to the post and radiate from said chamber; in the present instance four of these pipes are shown but any number may be employed; each pipe has a cock, $e'$.

Metal can receptacles or test-chambers, D, are employed each to receive one can, see Figs. 3 and 4; these receptacles when closed are air-tight and the tin-can to be tested is temporarily sealed so as to make it air-tight and inclosed in the receptacle, and each of the supply pipes, $e$, leads to one of these receptacles and enters through its head and also through the sealing cap which closes the top-end of the can and thus supplies compressed air to the interior of the sealed can. A leak-pipe, $f$, leads from each test-chamber, D, to a glass receptacle or cup, E, which contains water or other suitable liquid. In the present instance this cup is annular in shape and fits around the hollow post, B, being supported on the shelf, $f'$. The indicator cup may be of any other shape. Each leak-pipe, $f$, has an end which opens into the water or other liquid in the cup, and a leak is indicated by air-bubbles rising in the water.

What I term a dry test, and an "ocular demonstration" is thus obtained. As water does not touch the can, the latter is kept dry, which is a desideratum, and if leaks are in the can the compressed air will escape through the leak and pass through the leak-pipe, $f$, to the liquid cup; this leaked air will discharge into the liquid and the rising air-bubbles will indicate the fact of the leak.

The operation here described of detecting leaks would be substantially the same whether the greater pressure was in the interior of the can to leak outward, as in Figs. 3 and 4, or was on the exterior of the can to leak inward. To have the greater pressure on the exterior would simply require an obvious change of the relation of the supply-pipe and leak-pipe, as in Fig. 10. My improved method of testing cans consists therefore in sealing the can;

establishing different pressures on the exterior and the interior of the sealed can; and then directing any air that may escape from leaks in the can to a suitable indicator device such as a liquid-cup.

It is obvious that the means or apparatus to employ my method may vary greatly in its form and construction; I will now continue the description of one form of apparatus suitable for the purpose. The hollow post, B, the radiating pipes, $e$, test-chambers, D, leak-pipes, $f$, and liquid receptacle, E, in the present instance, all revolve continuously with the shaft, $b'$. The test-chambers are mounted on arms, F, fixed to the post and terminate at their outer ends in open frames, F'; at the end of each frame is a bearing, $g$, in which a rod, $h$, fits and is movable endwise; one end of this rod carries a head, D', to close the end of the test-chamber and the other end carries at its lower side a roller, $h'$. Surrounding the hollow post and attached to the arms of stand, A, is a stationary circular, or part circular, guide or groove made in two parts, G, G'; the part, G, is not circular but, rather is an irregular curve eccentric with regard to the hollow post, B, and the part, G', is circular as far as it goes and is concentric with said post. The first part, G, has a vertical flange, $i$, on its inner edge and the roller, $h'$, on the rod, $h$, bears on the outer side of said flange, $i$, and thus holds the chamber-head, D', drawn away from the chamber, D, keeping the latter open, and the second part, G', has a flange, $j$, on its outer edge and the said roller, $h'$, bears on the inner side of it and thus presses the chamber-head, D', close in contact with the test-chamber, D, and thereby closes it tight. It will thus be seen that when the post, B, and test-chambers revolve, for about one half of the revolution the rollers, $h'$, acting first on the outside of the flange, $i$, open the test-chambers to admit a can, and then for the other half of the revolution the said rollers acting on the inner side of the flange, $j$, close the test-chambers while the can is being tested.

The head, D', of the test-chamber has a flange around which is a gasket, $k$, serving to make an air-tight fit between the head and the end of the chamber. The head is loose on the rod, $h$, to permit it to have slight movement longitudinally along the rod; this movement is resisted by a spiral spring, $l$, around the rod and which is interposed between the head and a collar, $k'$, fast on the rod. The spring presses the head toward the chamber, D, and when the head is in the closed position, see Fig. 4, the pressure of this spring has the effect to compress the gasket, $k$, and make an air-tight fit. The rod, $h$, carries at its extremity a disk, $m$, which is fixed thereon by a pin, $m'$; this disk is to bear against the bottom end of the can, and is part of the can-holder.

Each test-chamber, D, has a can-holder coöperating with it; the can-holder comprises in this instance a yoke, $n$, having two down-curved prongs, $n^3$, and one end, $n'$, of the yoke is rigidly secured by the pin, $m'$, to the extremity of the rod, $h$, on the outer side of the disk, $m$, and the other end comprises a ring or collar, $n^2$, which takes loosely around the central neck, $o$, of the flanged disk, $o'$, which is the bearing for the top-end of the can. This central neck, $o$, is internally screw-threaded at, $o^2$, and has a contracted opening, $o^3$, without a thread, through which passes that part of the air-pipe, $e$, that is central in the test-chamber; the flanged disk, $o'$, thus may move along the air-pipe, $e$. The flange-disk carries a circular concaved elastic sealing-cap, $p$, thickest at its rim, $p'$, and having a central hole, $q$; a screw-bushing, $r$, has a flanged head, $r'$, and serves to confine the sealing-cap, $p$, on the disk, $o'$, by the screw-threads of the bushing passing through the hole, $q$, of the cap and engaging the screw-thread, $o^2$, of the central neck, and the flanged head, $r'$, engaging the sealing-cap. It will thus be seen that when a can to be tested is placed on the two down-curved prongs, $n^3$, between the disk, $m$, and the sealing cap, $p$, and the parts continue to revolve the rod, $h$, will move endwise in its slide-bearing, $g$, and the can-holder and can will move into the test-chamber, D, the flanged disk, $o'$, sliding along the air-pipe, $e$, the end of which latter will enter the mouth-end of the can; the head, D', will close the open end of the test-chamber, and as the end of the disk-neck, $o$, comes in contact with the inner end, $s$, of the test-chamber,—the endwise pressure of the rod, $h$, still continuing—the neck, $o$, will slip freely in the ring, $n^2$, of the yoke and thereby cause the sealing cap, $p$, to press tight and hard over the open can-mouth. It will be seen that the can is sealed by the rim-part, $p'$, only of the cap bearing on its end.

From the foregoing description it will be understood that the can to be tested is temporarily sealed; the sealed can is inclosed in a dry test-chamber; and in the form shown in Figs. 3, and 4, an air-pipe, $e$, enters the test-chamber and also the sealed can; compressed air may now be passed through the pipe, $e$, to the interior of the sealed can. If the can have holes in the tin-plate, or defective seams where solder has been applied, then the air in the can will leak therefrom into the closed test-chamber, D, and such leaking air will pass from the test-chamber by way of the leak-pipe, $f$, to the indicator device, which in the present instance, is the liquid cup, E; the air-bubbles rising in the liquid will demonstrate that the can leaks. As before stated this operation may be reversed and compressed air applied exteriorly on the can, in this case the pipes, $e$, and, $f$, would be arranged as in Fig. 10. Where the greater pressure is applied exteriorly on the can and the latter contains only atmospheric pressure, then the air in the test-chamber will leak therefrom into the can, and such leaking air will pass from the can by the pipe, $f$, shown in Fig. 10, to the liquid receptacle and there produce bubbles. The cans are fed into the can-holder automatically by the supply-chute, T, and the defective cans are removed and then pass off by the chute, U, while the perfect cans pass off by the chute, V. All the chutes are stationary; the supply chute, T, is above the machine and inclines down to it; the cans to be tested are placed in this chute by an attendant; the lower end of the chute is closed by a cross-plate, $w$, to stop the cans, and has in the bottom next to said cross-plate an opening, $w'$, to let a can drop through to the can-holder, $n^3$. Curved rails or tracks, $x$, are concentric with the post, B, and two such rails connect between each two of the arms, F, and the ends of each pair of rails terminate at the open frames, F'; a tin can which enters the can-holder while it has position outward at the open frame, must pass down between the ends of one set of said rails, $x$, and the ends of the adjoining set of rails. As the machine revolves the rails of course are also carried around, and pass immediately below the opening, $w'$, in the bottom of the supply-chute, T; if a number of tin cans are in said chute the lowermost can will not drop through the opening, $w'$, because said can will be sustained or held up by the rails or tracks, $x$, until the ends of said rails pass the said can, whereupon the can will drop onto the curved prongs, $n^3$, of the can-holder.

The operator of the machine has position at the releasing bar, Y, which is endwise-movable in suitable guides, $y$; this bar is horizontal and at its outer end has a handle, $y'$, and at its inner end has an upward-projecting prong, $y^2$; normally this bar is pulled outward so as to have its prong, $y^2$, at one side of the defective can-chute, U, see Fig. 1; when in this position the said prong, $y^2$, is out of the circular path traversed by the rails, $x$, and the can-holders, $n$, $n^3$, when they are outside of the test-chambers. But when the release bar is pushed in by the hand of the operator, the upward prong, $y^2$, will be directly below the rails, $x$, and in the path of the can-holders and at the upper end of the defective can-chute, U; consequently if the indicator, E, shows to the eye of the operator that the approaching test-chamber contains a leaky can, the operator will thereupon push in the release bar, Y, and the said leaky can, having at this point been withdrawn from the test-chamber, will strike the prong, $y^2$, on said bar and be thrown off the can-holder into the chute, U. If the indicator, E, shows that the approaching test-chamber contains a perfect can, the operator does not make any use of the release bar, Y, but allows the said perfect can to strike the upward projecting stud, $z$, at the high end of the delivery chute, V; this stud will cause the can to drop from the can-holder into the chute, V.

As already stated each air-supply pipe, $e$, has a cock, $e'$; the handle of this cock, see Fig. 3, is turned one way to open the cock and allow air to flow into the can that may be in the chamber, D, and said handle is turned the other way to cut-off the air-flow. This cock-handle is actuated or moved by two stationary upright studs, $e^2$, $e^3$, which project from short arms attached to the stand, A, at its center—being located below the revolving arms, F. These two studs are at diametrically-opposite sides of the post, B, and as the arms, F, and chambers, D, revolve the cock-handle of each supply-pipe will in its turn come in contact with the first stud, $e^2$, which opens the cock, and then later on will come in contact with the second stud, $e^3$, which closes the cock.

Briefly stated the operation of the machine here described is as follows: The empty cans roll down the supply chute, T; one can only will drop therefrom onto the prongs, $n^3$, of a can-holder; as the parts revolve the rod, $h$, will slide endwise on its bearing, $g$, and the can-holder, and can entered into the receptacle, D, and the head, D', will close the latter and the cap, $p$, seal the can;—the handle of the cock, $e'$, will now strike against the stud, $e^2$, and turn on the compressed air which fills the can; if the can have leaks the escaping air will pass to the chamber, D, and from thence by pipe, $f$, to the indicator, E, where bubbles will be seen. The handle of the cock, $e'$, will now strike the stud, $e^3$, and shut off the air, and the rod, $h$, then withdraws the head, D, can-holder and can from the chamber, and if the can be a leaky one the releasing-bar, Y, is now brought into use and the can discharged into the chute, U, but if the can be a perfect one it will be discharged into the chute, V.

The modification shown in Fig. 11 illustrates the changes necessary to use the vacuum plan. Here certain parts shown in Figs. 3, 4 and 10, are dispensed with; the chief of these is the test-chamber, D. The pipe, C', is an exhaust-pipe leading from a suitable suction apparatus; the liquid receptacle, E', in this case is necessarily closed tight, and the pipe, $e$, connects between the exhaust chamber, $d^2$, in the post and the liquid-receptacle, E'. The pipe, $f$, establishes communication from the can that is being tested to the liquid-receptacle. In other respects the construction of parts may, if desired, be like those shown in Fig. 3.

The operation of the vacuum plan is as follows:—Upon the air being exhausted from the post-chamber, $d^2$, and the liquid-receptacle, E', the pressure in the latter on the liquid would be less than in the sealed can, consequently the air in the can would expand and pass through the pipe, $f$, and discharge in the liquid, causing bubbles to rise therein. This exhaustion or partial exhaustion of air from the sealed can establishes a difference between the interior and the exterior pressure; as the greater pressure is now on the exterior, air from the exterior atmosphere will pass through any leaks into the can, and such leaking air will be exhausted from the can to the liquid receptacle, E'. In this vacuum test the can is known to be perfect, or free of leaks, by the air-bubbles ceasing. In the compressed-air test the can is known to be free of leaks by the entire absence of air-bubbles.

Fig. 9 shows a modification of the sealing cap and flanged disk; in this case the concavity is on the flanged disk, o', instead of on the cap, p. The essential feature is that either the cap or the disk must be concaved at the seating sides which are in contact, whereby the rim-part, p', only of the cap will cause pressure on the end of the can.

It is obvious certain parts of the machine shown may be used without using others, and that a machine may be organized differently from that here shown, my invention, therefore is not limited to either this construction or arrangement.

Having thus described my invention, I claim as new and desire to secure by Letters Patent of the United States—

1. The method of testing cans, consisting of sealing the can to be tested and keeping it dry; establishing different pressures on the exterior and the interior of the sealed can, directing any air that may escape from leaks in the can to a receptacle containing liquid so that air-bubbles rising in the liquid will indicate the leak.

2. In a can-testing machine, the combination of a can-sealing device; mechanism to establish different air pressures on the exterior and the interior of the can; a liquid receptacle to indicate leaks by rising air-bubbles; and means to establish communication from the can that is under test to said liquid receptacle.

3. In a machine for testing cans, the combination of an air-tight test-chamber to hold the can; a sealing device to close the mouth of the can while it is in the test-chamber; a pipe connected with the said sealing device; another pipe connected with the test-chamber, and a liquid-receptacle to indicate leaks by rising air-bubbles.

4. In a machine for testing cans, the combination of an air-tight test-chamber to hold the can; a sealing device to close the can; air-pipes connected with the said test-chamber and sealing device to establish different pressures on the exterior and the interior of the can; and a leak-indicator device.

5. In a machine for testing cans, the combination of an air-tight test-chamber to hold the can; a sealing device to close the mouth of the can while it is in the test-chamber; an air-pipe connected with the said sealing device; a receptacle to contain liquid, and a pipe leading from the test-chamber to said liquid receptacle.

6. In a machine for testing cans, the combination of the air-tight test-chamber to hold the can; a can-holder in the chamber with the can to be tested; a sealing device to close the can; an air-pipe entered through the test-chamber and connected with the said sealing device, and a leak-indicator device, substantially as described.

7. In a machine for testing cans, the combination of a can-sealing device; a receptacle containing liquid, and an air-pipe leading from said sealing-device and connecting with the receptacle below the surface of the liquid.

8. In a can testing machine, the combination of a can-sealing device; an air-tight receptacle to inclose the can; mechanism to establish different air-pressures on the exterior and the interior of the can; a receptacle to contain liquid, and a pipe having one end connected with the said can-receptacle and the other end with the liquid-receptacle below the surface of the liquid.

9. In a can-testing machine the combination of a revoluble hollow post; a number of test-chambers mounted to be carried around by the post; a liquid receptacle to indicate leaks by rising air-bubbles; an air-pipe leading from the hollow post to each test-chamber, and a leak-pipe leading from each test-chamber to the liquid receptacle.

10. In a can-testing machine the combination of a revoluble hollow post; a number of test-chambers each adapted to completely inclose a can and mounted so as to be carried around by the post; and a sealing device to close the mouth of each can while it is in the test-chamber.

11. In a can-testing machine the combination of a revoluble hollow post; a number of test-chambers each adapted to completely inclose a can and mounted so as to be carried around by the post; a sealing device to close the mouth of each can while it is in the test-chamber; a can-holder; and a leak-indicator.

12. In a can-testing machine the combination of a revoluble hollow post; a number of test-chambers mounted to be carried around by the post; and each chamber having a movable head; a sealing device to close the mouth of the can; a number of rods each of which is attached to one of the said movable heads; an irregular curved groove, G, co-acting with the rods to open the test-chambers, and a concentric groove co-acting with the rods to close the test-chambers.

13. In a can-testing machine the combination of a revoluble hollow post; a number of test-chambers mounted to be carried around by the post; a sealing device to close the mouth of each can while it is in the test-chamber; curved rails or tracks concentric with the post and connecting between each two test-chambers whereat the ends of the tracks terminate; and a supply-chute whose lower end is immediately above the said tracks.

14. In a can-testing machine the combination of a revoluble hollow post; a number of test-chambers mounted to be carried around by the post; a sealing device to close the mouth of each can while it is in the test-chamber; curved rails or tracks concentric with the post and connecting between each two test-chambers whereat the ends of the tracks terminate; a supply chute whose lower end is immediately above the said tracks; and a can holder to receive the can as it drops from the chute.

15. In a can-testing machine the combination of a revoluble hollow post; a number of test-chambers mounted to be carried around by the post; a sealing device to close the mouth of each can while it is in the test-chamber; two chutes below the machine—one for defective cans and the other for perfect cans; and a releasing bar to throw the leaky cans into the defective chute.

16. In a can testing machine the combination of a hollow post; a number of air-tight test-chambers mounted together to be revolved around the post; an air-pipe connecting each test-chamber with the hollow post; a controlling cock in each air-pipe, and two stationary studs having position in the circular path of the revolving cocks and co-acting with the handle of said cocks so as to turn them first one way and then the other.

17. In a can testing machine the combination of a hollow post; a number of air-tight test-chambers mounted together to be revolved around the post; an air-pipe connecting each test-chamber with the hollow post; a controlling cock in each air-pipe; a pipe connected with each test-chamber and an end of each pipe pointing downward, and a liquid cup into which the said downward-pointing end of the pipe projects.

18. In a can-testing machine the combination of a hollow air-post; a number of pipes to establish communication with said hollow post; means to establish different pressures on the exterior and the interior of the can; curved rails or tracks concentric with the post and with their ends terminating between every two can-sealing devices, and a supply chute whose lower end is immediately above the said tracks.

In testimony whereof I affix my signature in the presence of two witnesses.

WILLIAM B. MANN.

Witnesses:
CHARLES B. MANN, Jr.,
ALVAN MACAULEY.